US008484742B2

(12) United States Patent
Deyo (10) Patent No.: US 8,484,742 B2
(45) Date of Patent: Jul. 9, 2013

(54) RENDERED IMAGE COLLECTION OF POTENTIALLY MALICIOUS WEB PAGES

(75) Inventor: Roderic C Deyo, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1136 days.

(21) Appl. No.: 11/625,115

(22) Filed: Jan. 19, 2007

(65) Prior Publication Data

US 2008/0178286 A1    Jul. 24, 2008

(51) Int. Cl.
*H04L 29/06*    (2006.01)
(52) U.S. Cl.
USPC .................... 726/26; 726/22; 726/23; 726/25
(58) Field of Classification Search
USPC ......................................... 726/22, 23, 25, 26
See application file for complete search history.

(56) References Cited

U.S. PATENT DOCUMENTS

| 2003/0034905 | A1* | 2/2003 | Anton et al. .................... 341/51 |
| 2003/0140065 | A1* | 7/2003 | Lovvik et al. ................. 707/200 |
| 2005/0140787 | A1* | 6/2005 | Kaplinsky .................. 348/207.1 |
| 2005/0154601 | A1 | 7/2005 | Halpern et al. |
| 2005/0257261 | A1 | 11/2005 | Shraim et al. |
| 2006/0069697 | A1* | 3/2006 | Shraim et al. ................. 707/102 |
| 2006/0095955 | A1 | 5/2006 | Vong |
| 2006/0123464 | A1 | 6/2006 | Goodman et al. |
| 2006/0149580 | A1 | 7/2006 | Helsper et al. |
| 2006/0168066 | A1 | 7/2006 | Helsper et al. |
| 2006/0253446 | A1 | 11/2006 | Leong et al. |
| 2007/0162349 | A1* | 7/2007 | Silver .............................. 705/26 |
| 2008/0077995 | A1* | 3/2008 | Curnyn ........................... 726/27 |
| 2009/0055642 | A1* | 2/2009 | Myers et al. .................. 713/155 |

FOREIGN PATENT DOCUMENTS

| EP | 1681825 A1 | 7/2006 |
| WO | WO2006039208 A2 | 4/2006 |
| WO | WO2006060284 A2 | 6/2006 |
| WO | WO2006086929 A1 | 8/2006 |
| WO | WO2006090392 A2 | 8/2006 |

OTHER PUBLICATIONS

"COMODO Anti-Phishing Portfolio", retrieved at <<http://www.antiphishing.org/sponsors_technical_papers/Comodo%20-%20AntiPhishing%20Portfolio.pdf>> Comodo Inc., 2005, pp. 1-5.
Fu, et al., "EMD based Visual Similarity for Detection of Phishing Webpages", available at least as early as <<Nov. 15, 2006>>, <<at http://www.mit.edu/ayf/publication/WDA-antiphishing.pdf>>, City University of HongKong, pp. 04.
Tsow, "Phishing with Consumer Electronics: Malicious Home Routers", available at least as early as <<Nov. 15, 2006>> at <<http://www.cs.indiana.edu/atsow/papers/mal-router-long.pdf>>, Indiana University, pp. 1-16.
Wenyin, et al., "Detection of Phishing Webpages based on Visual Similarity", retrieved at <<http://www2005.org/cdrom/docs/p1060.pdf>>, WWW 2005, May 10-14, 2005, pp. 1060-1061.

* cited by examiner

*Primary Examiner* — Yin-Chen Shaw
*Assistant Examiner* — Bradley Holder
(74) *Attorney, Agent, or Firm* — Wolfe-SBMC (57) ABSTRACT

Techniques are described which may provide a rendered image of a website from a potentially malicious party. In an implementation, a rendered image is collected of a web page that is identified as potentially malicious from a frame buffer. A communication is then formed to be communicated over a network that includes the collected image.

20 Claims, 5 Drawing Sheets

RENDERED IMAGE COLLECTION OF POTENTIALLY MALICIOUS WEB PAGES

BACKGROUND

As the Internet continues to grow in popularity (e.g., users may perform online banking, surf for information on a variety of subjects, play games, and so on), so to have the attacks by malicious parties on users of the Internet. One of these attacks is known as a "phishing" attack, in which, malicious parties attempt to trick users into revealing personally identifiable information which may then be used to steal the users' identity, such as to fraudulently obtain credit cards in the users' name.

A malicious party, for example, may configure a counterfeit website to mimic a legitimate website, with which, the users have previously interacted, such as a banking website. For instance, the counterfeit website may include logos, text and other images taken from the legitimate website such that the counterfeit website has the same "look and feel" as the legitimate website. The counterfeit website may then prompt the user to enter personally identifiable information, such as user identification (e.g., an alias) and password to login to the website. The counterfeit website may also prompt the user, after the appearance of the login, to supply additional personally identifiable information, such as a home address, social security number, birthday, mother's maiden name, and so on. Because the user is presented with a legitimate-looking website, the user may experience an increased sense of comfort and therefore provide this information, which may then be used to steal the identity of the user. The stolen identity may then cause significant financial harm to the user as well as legitimate websites, which may experience a decrease in traffic as these attacks continue.

SUMMARY

Techniques are described which may provide a rendered image of a website from a potentially malicious party. In an implementation, a rendered image is collected of a web page that is identified as potentially malicious from a frame buffer. A communication is then formed to be communicated over a network that includes the collected image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Attacks by malicious parties on users of the Internet are becoming increasingly more common. One such attack is known as a "phishing" attack, which is typically used to obtain personally identifiable information of the user, such as user name, home address, social security number, and so on. This personally identifiable information may then be used to steal the identity of the user, such as to purchase goods over the Internet in the user's name.

Because of the harm that may be suffered by the users that lost their identity as well as legitimate websites that are often mimicked by the malicious parties, techniques have been developed to combat these "phishing" attacks. One such technique involves investigation of the websites that have been identified as potentially malicious to determine if these websites are counterfeit. For example, a technician may navigate to the website to determine if it is "legitimate" (i.e., appears to have non-malicious content) or malicious, e.g., needlessly requires personally identifiable information.

Because of these techniques, however, malicious parties have also taken steps to circumvent the investigations by the technicians. For example, the malicious party may configure the website to provide web pages that do not inquire about personally identifiable information a majority of the time. At other times, however, the website may provide the web pages that seek this information. In this way, the likelihood of a technician investigating the website and finding the malicious webpage is reduced, thereby increasing the probability that the malicious web pages will continue to be provided over a longer period of time.

Accordingly, techniques are described, in which, rendered images are collected of potentially malicious web pages. For example, a user may navigate to a web site (e.g., through "clicking" a link in an email) and be provided with a web page that mimics another website and that asks for personally identifiable information. The user, however, may have had previous experience with the website being mimicked and therefore suspect that this request is improper. Therefore, the user may identify this webpage as being potentially malicious, which may cause a rendered image of the webpage to be taken from a frame buffer of the client.

This rendered image may then be compressed and communicated over a network to a security service to investigate the website. Because the security service is provided with an actual rendered image of the webpage, the security service may "see what the user saw" and therefore protect against techniques that may be employed by the malicious party to defeat subsequent investigation, such as through use of a script engine to reconfigure the webpage when subsequently displayed. Thus, the security service may be provided with accurate information regarding the likelihood of the website being malicious and may react accordingly, such as to have the website blocked. Further discussion of these techniques may be found in relation to the following figures.

In the following discussion, an exemplary environment is first described that is operable to perform techniques to collected rendered images of potentially malicious web pages. Exemplary procedures and user interfaces are then described that may be employed in the exemplary environment, as well as in other environments.

Exemplary Environment

Figure 1:
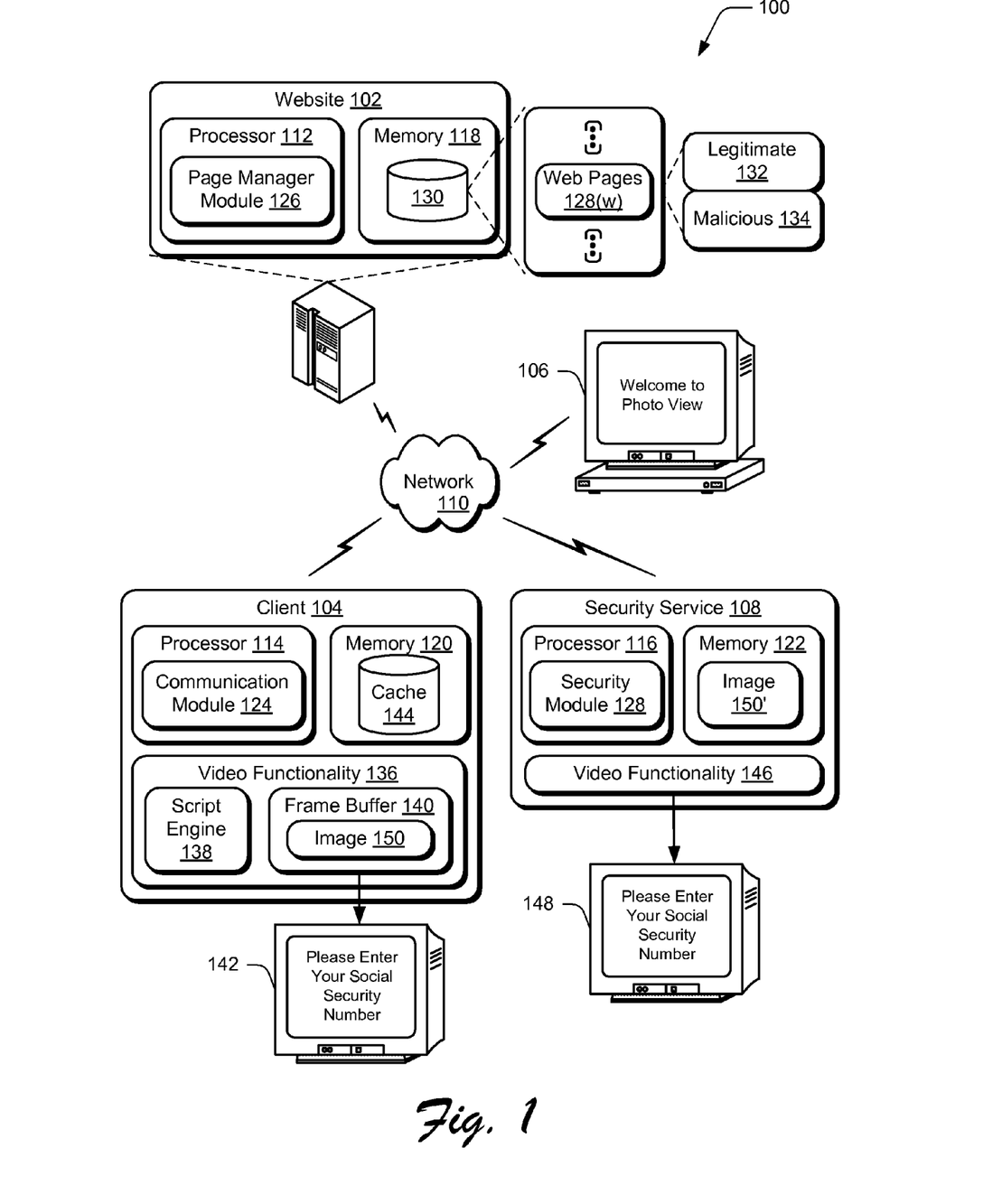
FIG. 1 is an illustration of an environment in an exemplary implementation that is operable to perform techniques to collected rendered images of potentially malicious web pages.

FIG. 1 is an illustration of an environment 100 in an exemplary implementation that is operable to perform techniques to collect rendered images of potentially malicious web pages. The illustrated environment 100 includes a website 102, a client 104, another client 106, and a security service 108 that are communicatively coupled, one to another, via a network 110. In the following discussion, the website 102, client 104, the other client 106 and the security service 108 may be representative of one or more entities, and therefore reference may be made to a single entity (e.g., the website 102) or multiple entities (e.g., the websites 102, the plurality of clients 104, and so on).

The clients 104, 106 may be configured in a variety of ways for network 110 access. For example, one or more of the clients 104, 106 may be configured as a computing device, such as a desktop computer, a mobile station, an entertainment appliance, a set-top box communicatively coupled to a display device, a wireless phone, a game console, and so forth. Thus, the clients 104, 106 may range from full resource devices with substantial memory and processor resources (e.g., personal computers, game consoles) to low-resource devices with limited memory and/or processing resources (e.g., traditional set-top boxes, hand-held game consoles). The clients 104, 106 in portions of the following discussion, may also relate to a person and/or entity that operate the clients. In other words, one or more of the clients 104, 106 may describe logical clients that include users, software, and/or devices.

The website 102 is illustrated in FIG. 1 as being implemented by a server, the clients 104, 106 are illustrated as client devices and the security service 108 is also illustrated as being implemented via a device, each of which may have respective processors 112, 114, 116 and memory 118, 120, 122. Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 118, 120, 122 is shown, respectively, for the server, client 104 and security service 108, a wide variety of types and combinations of memory may be employed, such as random access memory (RAM), hard disk memory, removable medium memory, and other types of computer-readable media. Additionally, although not illustrated, the other client 106 may also utilize a processor and memory.

Although the network 110 is illustrated as the Internet, the network may assume a wide variety of configurations. For example, the network 110 may include a wide area network (WAN), a local area network (LAN), a wireless network, a public telephone network, an intranet, and so on. Further, although a single network 110 is shown, the network 110 may be configured to include multiple networks.

The client 104 is illustrated as executing a communication module 124 on the processor 114, which is also storable in memory 122. The communication module 124 is representative of an executable module that is configured to provide functionality to communicate over the network 110, such as to communicate with the website 102 over the network 110. For example, the communication module 124 may be configured as a web browser that allows the client 104 to "surf" the Internet. In another example, the communication module 124 is configured as a "smart" client module that is configured to provide other network functionality as a part of its operation, such as an instant messaging module, an email module, an online banking module, and so on. A wide variety of other examples are also contemplated.

The client 104, for example, may execute the communication module 124 to access the website 102 over the network 110. The website 102 may be implemented via a page manager module 126 (which is illustrated as being executed on the processor 112 and is storable in memory 118) to provide one or more web pages 128(w) (where "w" can be any integer from one to "W") from storage 130 in the memory 118. The website 102, however, may be configured to provide both legitimate 132 (i.e., non-malicious) and malicious 134 web pages 128(w), such as malicious web pages 134 configured as a part of a "phishing" attack as previously described.

The website 102, for instance, may employ techniques to provide the "legitimate" 132 web pages 128(w) a majority of the time to protect against identification by the security service 108 of the malicious 134 web pages 128(w). This may be performed in a variety of ways. The page manager module 126, for example, may be configured to provide the malicious 134 pages once out of every "X" times (e.g., one hundred, one thousand, and so on). In another example, the web pages 128(w) may be configured to obtain additional content from the website 102 when being configured for rendering by video functionality 136 of the client 104. For instance, the web pages 128(w) may include scripts that are processed by a script engine 138 by "calling" to the website 102 to get additional content to "fill in" the web page 128(w) and then passed to a frame buffer 140 for display on a display device 142. This content, like the previous example, may be varied to be malicious or non-malicious to "hide" the attack from the security service 108.

The web page 128(w), for example, may ask a user to "Please Enter Your Social Security Number" when rendered a first time as shown on the display device 142 of the client 104 but merely show "Welcome to Photo View" when rendered another time, as shown on the display device of the other client 106 of FIG. 1. In this way, the web page 128(w) may provide different content at different times, even when taken from a cache 144 of web pages maintained in memory 120 of the client 104, itself.

For example, a web page, when called from the cache 144, may still be processed by the script engine 138 and therefore may "call" to the website 102 for additional content. Thus, if the web page is taken from the cache 144 and provided to the security service 108, the security service 108 may still be presented with the non-malicious content (e.g., "Welcome to Photo View") as opposed to the malicious content, e.g., "Please Enter Your Social Security Number" when rendered by the video functionality 146 of the security service 108 for output to and display by the display device 148.

Accordingly, the communication module 124 may employ techniques in which a rendered image 150 of the web page 128(w) is provided to the security service 108 over the network 110. By providing the rendered image 150, the security service 108 is protected against subsequent processing of the image by video functionality 146 such as may be performed when the web page is obtained from the cache 144. The security service, for instance, may view a copy of the image 150' and therefore "see what the user saw" when the web page 128(w) was rendered by the client 104. As illustrated in FIG. 1, for instance, the image 150' rendered on the display device 148 of the security service 108 matches the image 150 rendered by the display device 142 of the client 104. Further discussion of techniques to collect, compress, communicate and/or evaluate the web page and images of the web page may be found in relation to the following figures.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer readable memory devices, e.g., memory 112(m), 114(n). The features of the techniques to collect rendered images described below are platform-independent, meaning that the techniques may be implemented on a variety of commercial computing platforms having a variety of processors.

Exemplary Procedures

The following discussion describes techniques to collect rendered images of potentially malicious web pages, compress the image and analyze the images that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1.

Figure 2:
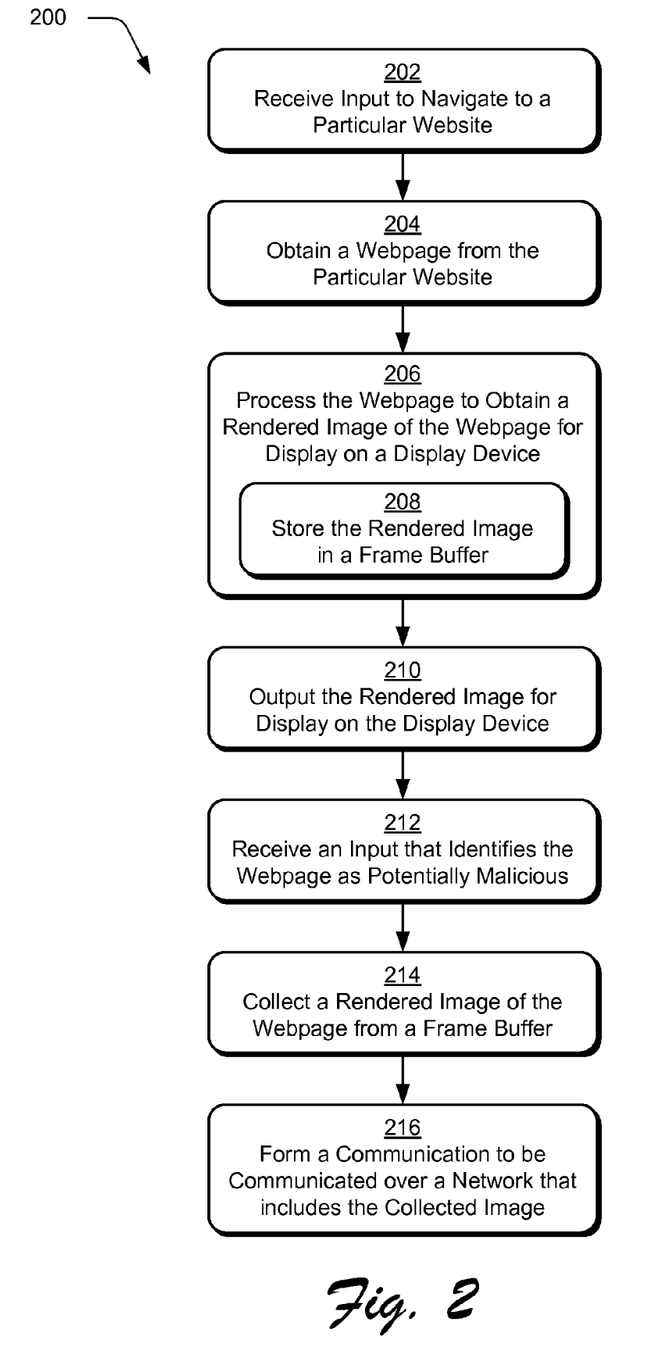
FIG. 2 is a flow diagram depicting a procedure in an exemplary implementation in which a rendered image is collected of a webpage that is identified as potentially malicious.

FIG. 2 depicts a procedure 200 in an exemplary implementation in which a rendered image is collected of a webpage that is identified as potentially malicious. An input is received to navigate to a particular website (block 202). A user of the client 104, for instance, may provide a URL of the website 102, the website 102 may be accessed via a link (e.g., from an email or from another website), and so on. A webpage is then obtained from the particular website (block 204).

The webpage is then processed to obtain a rendered image of the webpage for display on a display device (block 206). The video functionality 136 of the client 104, for instance, may include a script engine 138 that processes scripts contained in the webpage 128(w), such as to obtain additional content from the website 102 or other websites. Once processed, the rendered image 150 may be composed of a plurality of pixels that may be stored in a frame buffer 140 (block 208) and which are ready for output on the display device 142 (block 210). Thus, the rendered image 150 of the webpage 128(w) is generally not further modifiable by the website 102.

An input may be received that identifies the webpage as potentially malicious (block 212). For example, a browser may contain a portion that is selectable (e.g., through a drop-down menu, "right-clicking" a mouse, a display button in a tool bar, and so on) by a user when the user suspects that the webpage 128(w) is potentially malicious. The user, for instance, may be asked to provide personally identifiable information when not typically asked to do so, such as to provide a home address in addition to a username and password to access the website 102. The user may therefore suspect that the page is malicious and identify it as such through use of the selectable portion. In another example, functionality of the communication module 124 may be employed to automatically detect a potentially malicious webpage, such as detecting a request for personally identifiable information from a nonsensical domain (e.g., "www.ntrdtxacrsstrt.tv"), a request for a needlessly extensive list of personally identifiable information, and so on.

In response to the input that identifies the webpage as potentially malicious, a rendered image of the webpage is collected from a frame buffer (block 214). As previously described, the rendered image is generally composed of pixels and is stored in the frame buffer after processing by other parts of the video functionality 136 of the client 104, such as a script engine 138. Thus, the rendered image 150 is ready for display by the display device 142 of the client 104. A communication is then formed to be communicated over a network that includes the collected image (block 216). The communication may be formed in a variety of ways, such as to include a compressed version of the image 150, further discussion of which may be found in relation to the following figure.

Figure 3:
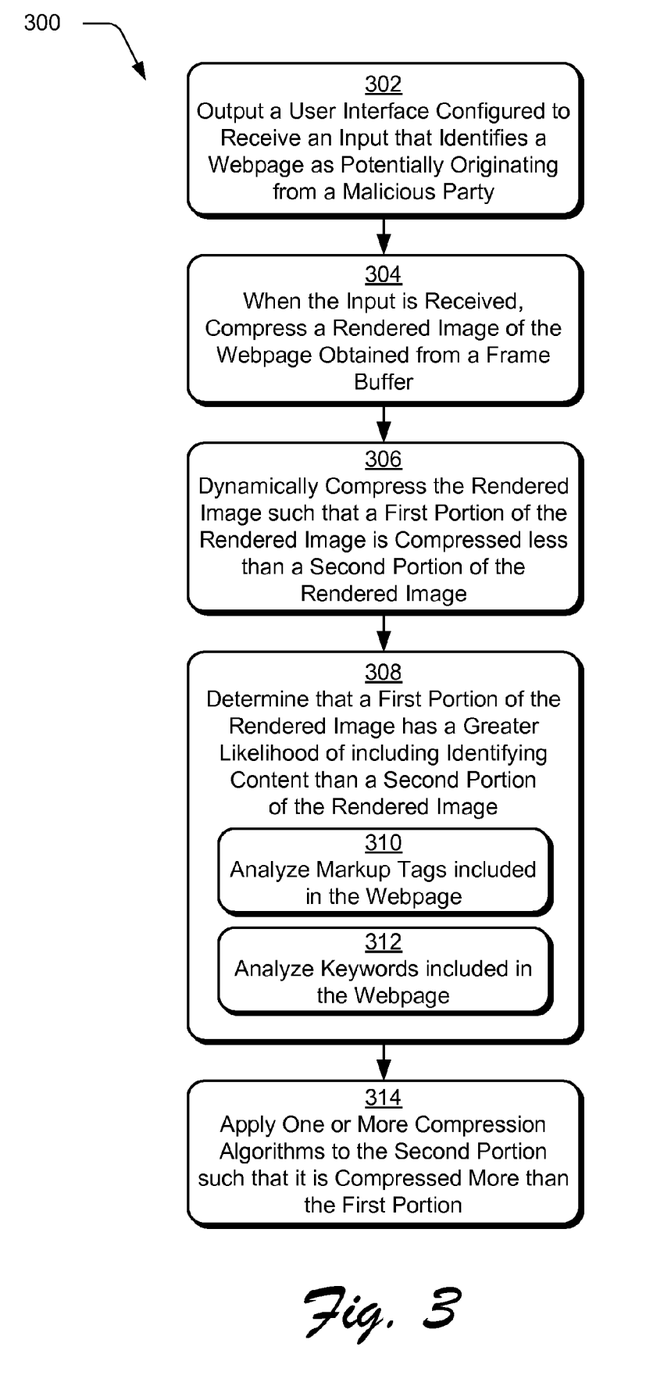
FIG. 3 is a flow diagram depicting a procedure in an exemplary implementation in which a rendered image of a potentially malicious webpage collected from a frame buffer is compressed.

FIG. 3 depicts a procedure 300 in an exemplary implementation in which a rendered image of a potentially malicious webpage collected from a frame buffer is compressed. During the discussion of FIG. 3, reference is also made to an exemplary implementation 400 of a user interface 402 illustrated in the exemplary implementation of FIG. 4.

A user interface is output that is configured to receive an input that identifies a web page as potentially originating from a malicious party (block 302). The user interface 402 of FIG. 4, for instance, that is illustrated as being displayed on the display device 142 of the client 104 may include a drop-down or pop-up menu that includes a command to "mark" the webpage as being potentially malicious. A user of the client 104, for example, may suspect that a network address of "www.swqvlus.sc/wudios$9882" does not correspond to a "Bank of the Web" website.

When the input is received, a rendered image of the webpage obtained from a frame buffer is compressed (block 304). This compression may be performed in a variety of ways using one or more compression algorithms, such as Joint Photographic Experts Group (JPEG) compression.

Figure 4:
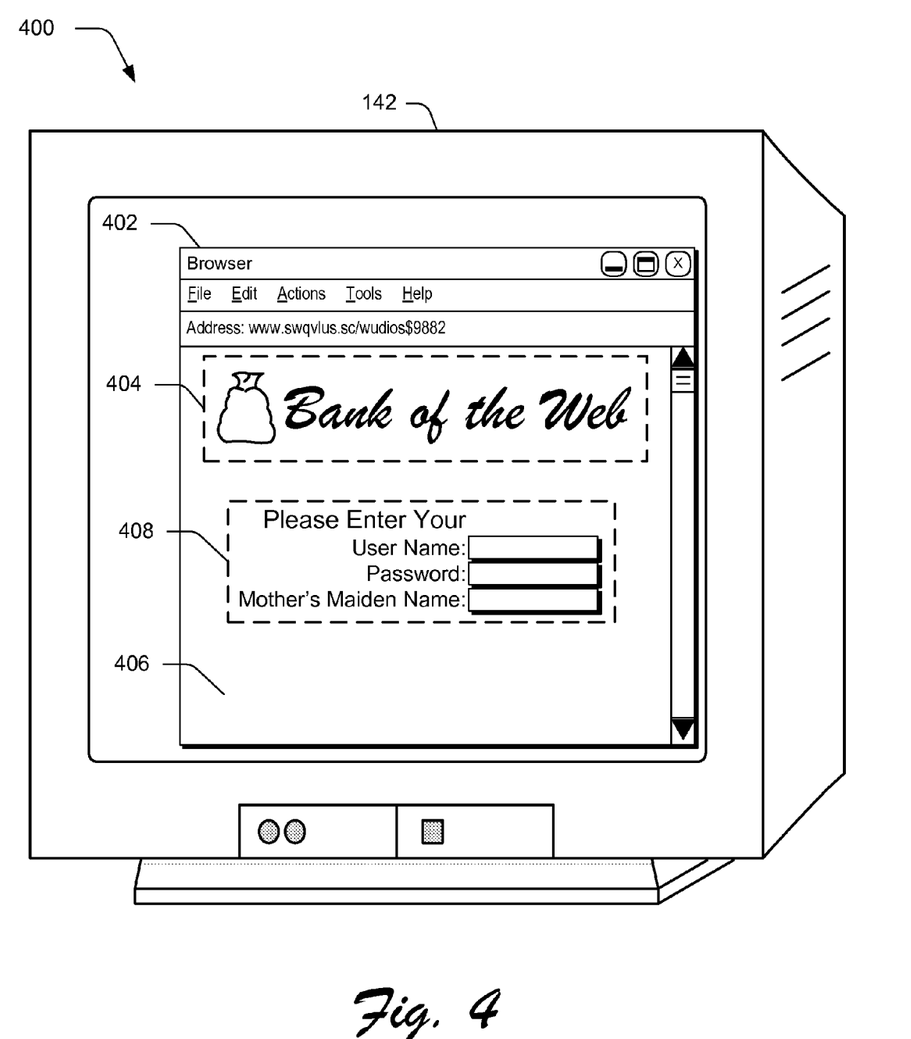
FIG. 4 is an illustration of an exemplary user interface in which different portions of a webpage having differing amounts and types of identifying information is shown.

The rendered image, for example, may be dynamically compressed such that a first portion of the rendered image is compressed less than a second portion of the rendered image (block 306). A first portion 406 of the webpage, for instance, may include more complex graphics than a second portion 408 of the web page and therefore a greater amount of compression may be applied to the second portion 408 of the web page.

In another example, a determination may be made that a first portion of the rendered image has a greater likelihood of including identifying content than a second portion of the image (block 308). For instance, this determination may also be made as previously described in which the complexity of the graphics is taken into account for compression. In another instance, markup tags included in the webpage may be analyzed (block 310) to determine whether particular portions of a marked-up webpage may include information that is likely to assist in determining whether the webpage is malicious or not, such as a markup tag indicating that a portion 408 of the page includes data-entry fields. In a further instance, keywords included in the webpage are analyzed (block 312), such as to note that the words "Mother's Maiden Name" and "Password" are included in a portion 408 and therefore may be compressed less than another portion, e.g., portion 406. A variety of other instances are also contemplated in order to locate identifying portions of a webpage that may be used to determine whether the webpage is potentially malicious.

One or more compression algorithms are applied to the second portion such that it is compressed more than the first portion (block 314) of the webpage. For example, the same algorithm may be employed to the different portions but applied such that the second portion is compressed more than the first portion, different algorithms may be applied, and so on. The compressed image may then be incorporated into a communication to be sent over the network to a security service 108, further discussion of which may be found in relation to the following figure.

Figure 5:
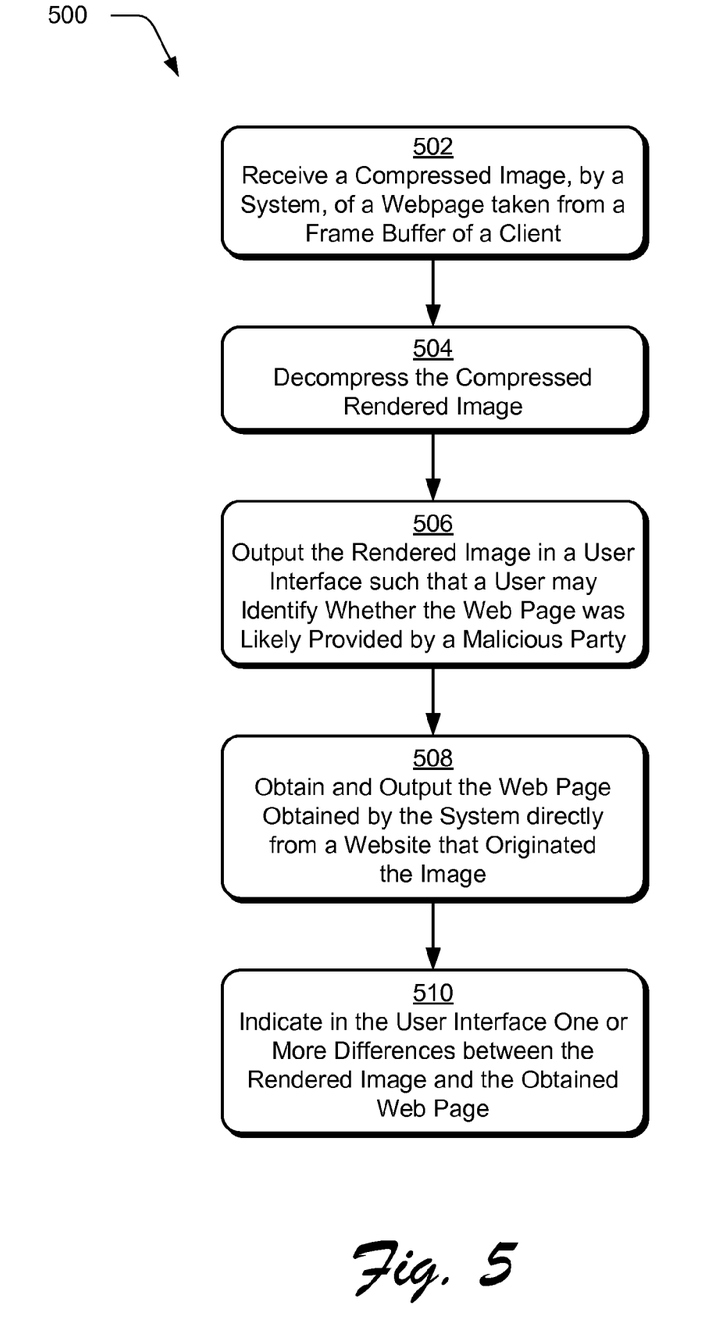
FIG. 5 is a flow diagram depicting a procedure in an exemplary implementation in which a compressed image is received by a security service to determine whether the webpage was likely provided by a malicious party.

FIG. 5 depicts a procedure 500 in an exemplary implementation in which a compressed image is received by a security service to determine whether the webpage was likely provided by a malicious party. A compressed image is received, by a system, of a webpage taken from a frame buffer of a client (block 502). The image 150', for instance, may be received via the network 110 by the security service 108. The compressed rendered image is then decompressed (block 504), such as by execution of the security module 128 to use appropriate algorithms to decompress the image, such as to use different algorithms on different portions of the image, use different techniques for the algorithms, and so on.

The rendered image is then output in a user interface such that a user may identify whether the webpage was likely provided by a malicious party (block 506). A technician, for instance, may view a display of the image 150' on the display device 148. The display may be configured in a variety of ways. For example, the display may indicate those portions that were determined to have a greater likelihood of having identifying content, such as through highlighting, circling of the portions, and so on.

In another example, an automatic comparison may be performed by the security module 128. For instance, a web page may be obtained and output by the system directly from a website that originated the image (block 508). For instance, the security service 108, and more particularly the security module 128, may also receive a network address of where the webpage 128(w) that was used to form the image 150', i.e., the address of the website 102. The security service 108 may then also obtain a webpage from the website and compare them to determine differences, if any, between the two. An indication may then be made in the user interface of one or more differences between the rendered image and the obtained web page (block 510), such as through highlighting, circling, superimposing, and so on. In an implementation, the comparison may be used to "pre-screen" the images to determine whether a technician should further investigate. A variety of other examples are also contemplated.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
   displaying, on a computing device, a user interface that is configured to display a rendered image of a web page and at least one user input mechanism to enable a user to enter input that specifies the web page is potentially malicious, the rendered image comprising a plurality of pixels stored in a frame buffer of the computing device;
   receiving, with the computing device, input, via the at least one user input mechanism displayed on the user interface, that specifies the web page is potentially malicious;
   responsive to receiving the input that specifies the web page as potentially malicious, collecting, with the computing device, the plurality of pixels of the rendered image of the web page that is identified as potentially malicious from the frame buffer of the computing device;
   determining, with the computing device, that a first portion of a rendered image has a greater likelihood of including identifying content than a second portion of the rendered image, the identifying content configured to assist in identifying whether the web page is malicious;
   compressing, with the computing device, the collected plurality of pixels of the rendered image of the web page; and
   forming, with the computing device, a communication to be communicated over a network that includes the compressed plurality of pixels of the rendered image.

2. A method as described in claim 1, wherein the user is a user of a client that includes the frame buffer and that performs the collecting and the forming.

3. A method as described in claim 1, wherein the compressing is dynamic such that a first portion of the plurality of pixels of the rendered image is compressed less than a second portion of the collected plurality of pixels of the rendered image.

4. A method as described in claim 3, wherein the dynamic compressing includes:
   determining, with the computing device, that the first portion of the rendered image has a greater likelihood of including identifying content than the second portion of the rendered image; and
   applying, with the computing device, one or more compression algorithms to the second portion of the plurality of pixels of the rendered image such that it is compressed more than the first portion of the plurality of pixels of the rendered image.

5. A method as described in claim 4, wherein the determining is based at least in part on analysis of the web page.

6. A method as described in claim 5, wherein the analysis is based at least in part on markup tags included in the web page.

7. A method as described in claim 1, wherein the formed communication includes the web page from a cache included on a client that performs the collecting and the forming.

8. A system comprising one or more processors and memory configured to store instructions that, responsive to execution by the one or more processors, causes the one or more processors to perform operations comprising:
   displaying a user interface that is configured to display a rendered image of a web page and at least one user input mechanism to enable a user to enter input that specifies the web page is potentially malicious, the rendered image comprising a plurality of pixels stored in a frame buffer of a computing device;
   receiving input, via the at least one user input mechanism displayed on the user interface, that specifies the web page is potentially malicious;
   responsive to receiving the input that specifies the web page as potentially malicious, collecting the plurality of pixels of the rendered image of the web page that is identified as potentially malicious from the frame buffer of the computing device;

determining that a first portion of a rendered image has a greater likelihood of including identifying content than a second portion of the rendered image, the identifying content configured to assist in identifying whether the web page is malicious;

compressing the collected plurality of pixels of the rendered image of the web page; and forming a communication to be communicated over a network that includes the compressed plurality of pixels of the rendered image.

9. A system as described in claim 8, wherein the user is a user of a client that includes the frame buffer and that performs the collecting and the forming.

10. A system as described in claim 8, wherein the compressing is dynamic such that a first portion of the plurality of pixels of the rendered image is compressed less than a second portion of the collected plurality of pixels of the rendered image.

11. A system as described in claim 10, wherein the dynamic compressing includes:

determining, with the computing device, that the first portion of the rendered image has a greater likelihood of including identifying content than the second portion of the rendered image; and applying, with the computing device, one or more compression algorithms to the second portion of the plurality of pixels of the rendered image such that it is compressed more than the first portion of the plurality of pixels of the rendered image.

12. A system as described in claim 11, wherein the determining is based at least in part on analysis of the web page.

13. A system as described in claim 12, wherein the analysis is based at least in part on markup tags included in the web page.

14. A system as described in claim 8, wherein the formed communication includes the web page from a cache included on a client that performs the collecting and the forming.

15. A method comprising:

displaying, on a computing device, a user interface that is configured to display a rendered image of web content and at least one user input mechanism to enable a user to enter input that specifies the web content is potentially malicious, the rendered image comprising a plurality of pixels stored in a frame buffer of the computing device;

receiving, with the computing device, input, via the at least one user input mechanism displayed on the user interface, that specifies the web content is potentially malicious;

responsive to receiving the input that specifies the web content as potentially malicious, collecting, with the computing device, the plurality of pixels of the rendered image of the web content that is identified as potentially malicious from the frame buffer of the computing device;

determining, with the computing device, that a first portion of a rendered image has a greater likelihood of including identifying content than a second portion of the rendered image, the identifying content configured to assist in identifying whether the web content is malicious;

compressing, with the computing device, the collected plurality of pixels of the rendered image of the web content; and forming, with the computing device, a communication to be communicated over a network that includes the compressed plurality of pixels of the rendered image.

16. A method as described in claim 15, wherein the user is a user of a client that includes the frame buffer and that performs the collecting and the forming.

17. A method as described in claim 15, wherein the compressing is dynamic such that a first portion of the plurality of pixels of the rendered image is compressed less than a second portion of the collected plurality of pixels of the rendered image.

18. A method as described in claim 17, wherein the dynamic compressing includes:

determining, with the computing device, that the first portion of the rendered image has a greater likelihood of including identifying content than the second portion of the rendered image; and applying, with the computing device, one or more compression algorithms to the second portion of the plurality of pixels of the rendered image such that it is compressed more than the first portion of the plurality of pixels of the rendered image.

19. A method as described in claim 18, wherein the determining is based at least in part on analysis of the web content.

20. A method as described in claim 19, wherein the analysis is based at least in part on markup tags included in the web content.

* * * * *